(12) United States Patent
Frantz et al.

(10) Patent No.: US 10,231,001 B2
(45) Date of Patent: Mar. 12, 2019

(54) SYSTEMS AND METHODS FOR PROVIDING AUDIO CONTENT DURING TRICK-PLAY PLAYBACK

(71) Applicant: DIVX, LLC, San Diego, CA (US)

(72) Inventors: William Frantz, San Diego, CA (US); Eric William Grab, San Diego, CA (US)

(73) Assignee: DIVX, LLC, San Diego, CA (US)

(*) Notice: Subject to any disclaimer, the term of this patent is extended or adjusted under 35 U.S.C. 154(b) by 0 days.

(21) Appl. No.: 15/163,370

(22) Filed: May 24, 2016

(65) Prior Publication Data

US 2017/0347136 A1 Nov. 30, 2017

(51) Int. Cl.
| | |
|---|---|
| H04N 7/16 | (2011.01) |
| H04N 21/2387 | (2011.01) |
| G11B 27/10 | (2006.01) |
| H04N 21/242 | (2011.01) |
| H04N 21/43 | (2011.01) |
| H04N 21/431 | (2011.01) |
| H04N 21/44 | (2011.01) |
| H04N 21/61 | (2011.01) |

(Continued)

(52) U.S. Cl.
CPC ....... *H04N 21/2387* (2013.01); *G11B 27/005* (2013.01); *G11B 27/10* (2013.01); *H04N 21/242* (2013.01); *H04N 21/4302* (2013.01); *H04N 21/4312* (2013.01); *H04N 21/44004* (2013.01); *H04N 21/6125* (2013.01); *H04N 21/6587* (2013.01); *H04N 21/8456* (2013.01)

(58) Field of Classification Search
USPC .................................................. 725/74–104
See application file for complete search history.

(56) References Cited

U.S. PATENT DOCUMENTS

| | | |
|---|---|---|
| 5,751,280 A | 5/1998 | Abbott |
| 5,953,485 A | 9/1999 | Abecassis et al. |

(Continued)

FOREIGN PATENT DOCUMENTS

| | | |
|---|---|---|
| EP | 2509073 A1 | 10/2012 |
| WO | 2017205028 A1 | 11/2017 |

OTHER PUBLICATIONS

International Preliminary Report on Patentability for International Application No. PCT/US2013/042105, Report issued Dec. 16, 2014, dated Dec. 24, 2014, 8 Pgs.

(Continued)

*Primary Examiner* — Mushfikh I Alam
(74) *Attorney, Agent, or Firm* — KPPB LLP

(57) ABSTRACT

Systems and methods for providing playback of audio content during a trick-play mode in accordance with embodiments of the invention are disclosed. Media content can include audio content and video content. The audio content is divided into segments and the video content includes frames. Synchronization information associates a presentation time of each of the segments of the audio content with a presentation time of one or more frames associated with the images of the video content. When a trick-play mode is requested, the next frame from the video content to present is determined. The synchronization information is used to determine the segments of the audio content associated with the next frame. The determined segments audio content are presented as the frames are displayed in trick-play mode.

26 Claims, 8 Drawing Sheets

(51) Int. Cl.
*H04N 21/6587* (2011.01)
*H04N 21/845* (2011.01)
*G11B 27/00* (2006.01)

(56) References Cited

U.S. PATENT DOCUMENTS

| | | | |
|---|---|---|---|
| 6,181,383 B1 | 1/2001 | Wine et al. | |
| 6,404,978 B1* | 6/2002 | Abe | G11B 27/034 |
| | | | 386/230 |
| 6,434,321 B1 | 8/2002 | Eshima et al. | |
| 6,728,678 B2 | 4/2004 | Bhadkamkar et al. | |
| 6,792,047 B1 | 9/2004 | Bixby et al. | |
| 6,801,544 B1 | 10/2004 | Rijckaert et al. | |
| 6,829,781 B1* | 12/2004 | Bhagavath | H04N 21/235 |
| | | | 375/E7.004 |
| 6,920,181 B1 | 7/2005 | Porter et al. | |
| 6,995,311 B2 | 2/2006 | Stevenson | |
| 7,116,894 B1 | 10/2006 | Chatterton | |
| 7,414,550 B1 | 8/2008 | Sudharsanan et al. | |
| 7,624,337 B2 | 11/2009 | Sull et al. | |
| 7,991,270 B2 | 8/2011 | Yahata et al. | |
| 8,059,942 B2 | 11/2011 | Yahata et al. | |
| 8,086,087 B2 | 12/2011 | Kato | |
| 8,219,553 B2* | 7/2012 | Bedingfield, Sr. | |
| | | | G06F 17/30038 |
| | | | 707/736 |
| 8,238,722 B2 | 8/2012 | Bhadkamkar | |
| 8,548,298 B2 | 10/2013 | Yahata et al. | |
| 8,655,156 B2* | 2/2014 | Begen | H04N 5/931 |
| | | | 386/207 |
| 8,677,397 B2 | 3/2014 | Van De Pol et al. | |
| 8,832,297 B2 | 9/2014 | Soroushian et al. | |
| 8,856,371 B2 | 10/2014 | Kariti et al. | |
| 9,281,011 B2 | 3/2016 | Erofeev et al. | |
| 2002/0003948 A1 | 1/2002 | Himeno et al. | |
| 2002/0150126 A1 | 10/2002 | Kovacevic | |
| 2003/0043924 A1 | 3/2003 | Haddad et al. | |
| 2003/0044166 A1 | 3/2003 | Haddad | |
| 2005/0246738 A1* | 11/2005 | Lockett | H04N 5/4403 |
| | | | 725/43 |
| 2006/0269221 A1 | 11/2006 | Hashimoto et al. | |
| 2007/0002946 A1 | 1/2007 | Bouton et al. | |
| 2007/0006063 A1 | 1/2007 | Jewsbury et al. | |
| 2007/0208571 A1 | 9/2007 | Lemieux | |
| 2009/0326930 A1 | 12/2009 | Kawashima et al. | |
| 2012/0076209 A1 | 3/2012 | Matsunaga et al. | |
| 2012/0081567 A1 | 4/2012 | Côté et al. | |
| 2012/0113270 A1 | 5/2012 | Spracklen et al. | |
| 2012/0140018 A1 | 6/2012 | Pikin et al. | |
| 2012/0278842 A1 | 11/2012 | Look et al. | |
| 2013/0007200 A1 | 1/2013 | van der Schaar et al. | |
| 2013/0007297 A1 | 1/2013 | Soroushian et al. | |
| 2013/0141643 A1 | 6/2013 | Carson et al. | |
| 2014/0143799 A1* | 5/2014 | Nagorniak | H04N 21/44008 |
| | | | 725/32 |
| 2014/0282262 A1 | 9/2014 | Gregotski et al. | |
| 2014/0359681 A1* | 12/2014 | Amidei | H04N 21/8547 |
| | | | 725/93 |
| 2015/0131966 A1 | 5/2015 | Zurek et al. | |
| 2015/0208020 A1 | 7/2015 | Castiglione | |
| 2016/0065635 A1* | 3/2016 | Besehanic | G06Q 30/02 |
| | | | 709/224 |
| 2016/0105675 A1* | 4/2016 | Tourapis | H04N 19/156 |
| | | | 375/240.02 |
| 2016/0156873 A1* | 6/2016 | Toye | H04N 5/63 |
| | | | 348/453 |
| 2016/0173931 A1* | 6/2016 | Eber | H04N 21/242 |
| | | | 725/38 |

OTHER PUBLICATIONS

International Search Report and Written Opinion for International Application No. PCT/US2013/042105, International Filing Date May 21, 2013, Search Completed Nov. 14, 2013, dated Dec. 3, 2013, 9 pgs.
International Search Report and Written Opinion for International Application No. PCT/US2017/031097, Search completed Jun. 29, 2017, dated Jul. 21, 2017, 8 Pgs.
"MPEG-2, Part 1, ISO/IEC 13818-1", Information technology—Generic Coding of Moving Pictures and Associated Audio: Systems, Nov. 13, 1994, 161 pgs.
"MPEG-4, Part 14, ISO/IEC 14496-14", Information technology—Coding of audio-visual objects, Nov. 15, 2003, 18 pgs.
Fielding et al., "Hypertext Transfer Protocol—HTTP1.1", Network Working Group, RFC 2616, Jun. 1999, 114 pgs.
Schulzrinne et al., "Real Time Streaming Protocol (RTSP)", Internet Engineering Task Force, RFC 2326, Apr. 1998, 80 pgs.

\* cited by examiner

SYSTEMS AND METHODS FOR PROVIDING AUDIO CONTENT DURING TRICK-PLAY PLAYBACK

FIELD OF THE INVENTION

The present invention generally relates to adaptive streaming and more specifically to streaming systems that may provide audio content during a trick-play mode of playback.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

To provide a consistent means for the delivery of media content over the Internet, the International Organization for Standardization (ISO) and the International Electrotechnical Commission (IEC) have put forth the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

As the latency with which content can be adaptively streamed has improved, streaming of live events, such as sporting events and concerts, has become popular. In this type of content, the audio portion of the content may give indications of portions of the presentation that may be of interest to user. As such, users may want to use audio cues when searching the media content to find parts of the content that are of interest. However, most conventional playback systems do not provide playback of audio content during the use of trick-play features such as rewind, fast forward and seek to find content of interest. Systems and methods for providing playback of audio content during playback in a trick-play mode in accordance with some embodiments of the invention are disclosed.

SUMMARY OF THE INVENTION

In accordance with some embodiments of the invention, a playback device is configured to perform a process for providing trick-play playback with audio content in the following manner, the playback device stores of segments of an audio content portion and frames of a video content portion of media content in a buffer in a playback device. Synchronization information is stored in a memory in the playback device. The synchronization information associates a presentation time of each of one or more of the segments of the audio content portion with the presentation time of one or more of the frames of the video content. The playback device receives a command for playback of the media content in a trick-play mode. The next frame to present is determined by the playback device based upon the trick-play mode. Each segment of audio content associated with the next frame is determined from the synchronization information stored in memory. The playback device presents each of the segments audio content associated with the next frame during playback in the trick-play mode.

In accordance with some embodiments the determined next frame is presented on a display of the playback device. In accordance with some of these embodiments, each segment of the audio content associated with the next frame is presented concurrently with the presentation of the next frame. In accordance with some other of these embodiments, the playback device adds each segment of the audio content associated with the next frame to a queue in response to the determination of the associated segments of the audio content and each segment of audio content associated with the next frame is presented based upon the queue and is independent of the presentation of the next frame from the video content on the display of the playback device.

In accordance with some embodiments, the playback device generates a display of a scrubber for the video content indicating a presentation time of the next frame from the video content and overlays the display of the scrubber for the video content over the presentation of the image on the display. In accordance with many embodiments, the playback device generates a display of a scrubber for the audio content indicating a presentation time of each segment of the audio content associated with the next frame and overlays the display of the scrubber for the audio content over the presentation of the image on the display. In accordance with a number of embodiments, the scrubber for the audio content is separate from a scrubber for the video content in the display.

In accordance with many embodiments, data for the segments of the audio content portion, data for the plurality of frames of the video content, and the synchronization information are received in the playback device from a content provider system over a network using adaptive bitrate streaming. In accordance with a number of these embodiments, the receiving of the data is performed in the following manner. The playback device receives a top level index file from the content provider system over a network. The top level index files identifies alternative streams of video content wherein at least a portion of the plurality of alternative streams are encoded at different maximum bitrates, and at least one stream of audio content. The playback device requests portions of the video content from the content provider using the alternative streams based upon the network bandwidth between the playback device and the content provider system and receives the requested portions of the video content in the playback device in response to the requests. The playback device generates the frames of the video content from the portions of video content received stores the plurality of frames in a buffer. The playback device also requests portions of the audio content from the at least one streams of audio content from the content provider system, receives the requested portions of the audio content, generates the segments of the audio content from the portions of audio content received and stores the segments of audio content in a buffer. The playback device obtains the synchronization information from the content provider system based upon information in the top level index file and stores the synchronization information in the memory of the playback device. In accordance with some of these embodiments, the synchronization information is obtained by reading a pointer to a file including the synchronization information from the top level index file, requesting the file from content provider system using the playback device, and receiving the requested file in the playback device.

DETAILED DESCRIPTION

Figure 1:
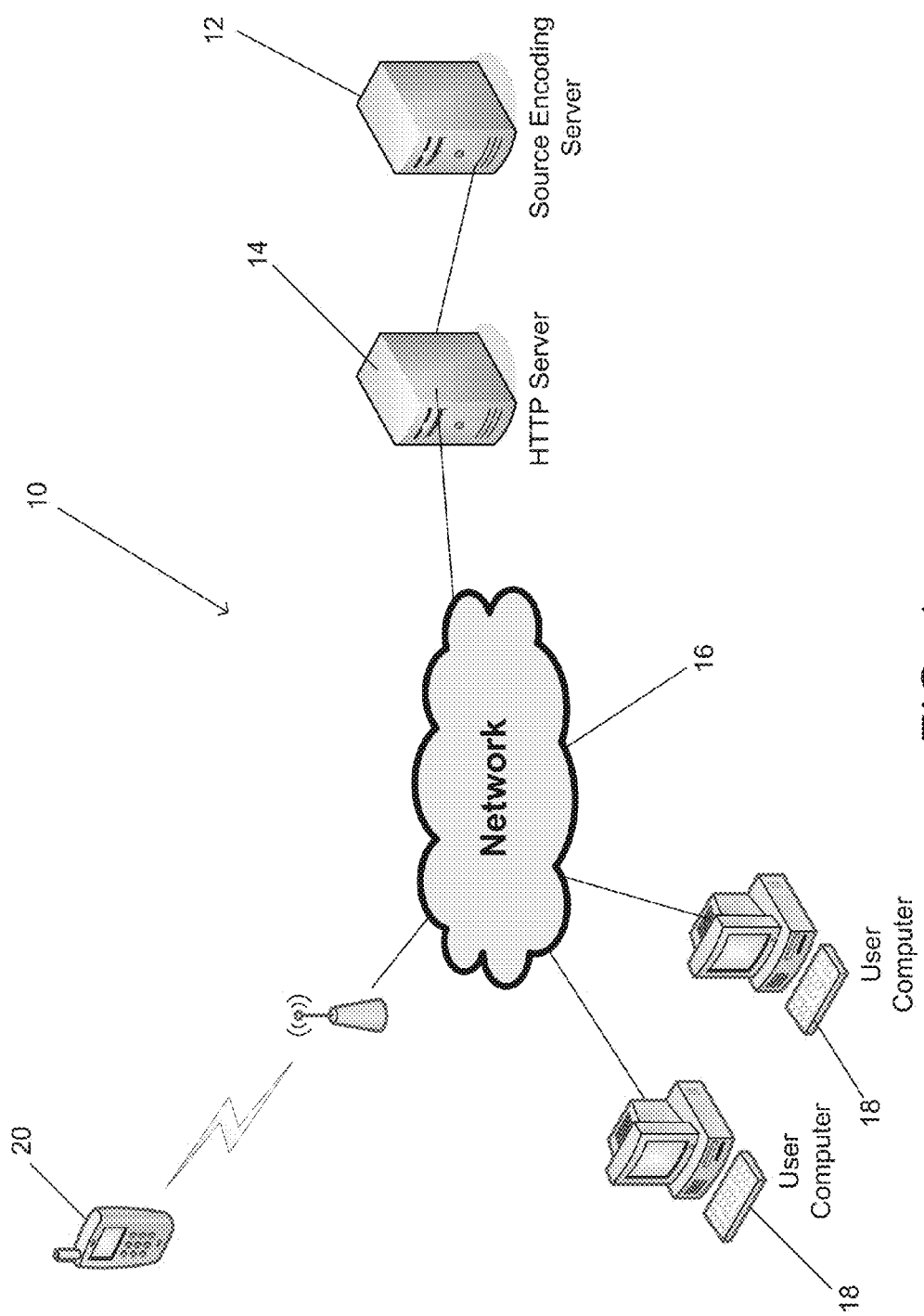
FIG. 1 illustrates a network diagram of an adaptive bitrate streaming system in accordance with an embodiment of the invention.

Turning now to the drawings, systems and methods for providing playback of audio content during playback of video content in a trick-play mode in accordance with some embodiments of the invention are illustrated. For purposes of this discussion, a trick-play mode is a mode in which video content is presented in a manner other than the sequential presentation of video content in the accordance with an intended presentation time. Examples of trick-play modes include, but are not limited to, rewind, fast forward, and seek. In accordance with some embodiments, a trick-play mode is initiated by the playback device receiving a command from a user indicating a particular trick-play mode. The playback device then begins trick mode play by determining which image of the video content to display next and the frame of video content associated with the image. In several embodiments, the playback device then determines one or more segments of audio content associated with the frame. The image is then presented on the display of the playback device and the segment of audio content is presented via an audio system of the playback device.

In accordance with some embodiments, the segment of the audio content is only presented as long as the associated frame(s) is being presented. In accordance with some other embodiments, the entirety of the segment of audio data is played regardless of the current frame being presented. In accordance with many of these embodiments, a queue of segments of audio content to play is maintained and the segments are played from the queue in a sequential order regardless of the frames being displayed. In accordance with a number of these embodiments, the current frame being presented is determined when a segment of audio content ends and the audio content associated with the current frame is presented, which may cause segments of audio content in the queue that are associated with frames that were presented while the previous segment of audible content was being presented to be skipped. In accordance with some embodiments, the presentation of one or more audio segments associated with a frame(s) is repeated if the frame(s) is still being presented when the presentation of the one or more audible segment associated with the frame ends.

In accordance with some embodiments, synchronization information indicating the association of segments of the audio data with frames of video content is generated by an encoding device. In accordance with some embodiments, the synchronization information may be determined from a subtitle track or closed caption track which associates video presentation times to verbal commentary and/or dialog. In accordance with several of these embodiments, the synchronization information is stored in files storing the audio and/or video content. In accordance with a number of other embodiments, the synchronization information is stored in an index file associated with the media content. The synchronization information can be retrieved at the start of playback and stored for use when a trick-play mode is requested.

In accordance with many embodiments, a playback device that provides audio playback during a trick-play mode uses adaptive bit rate streaming to obtain the media content. In accordance with some of these embodiments, the media content is stored in streams in accordance with the DASH standards. However, one skilled in the art will recognize that the formats such as but not limited to, a Matroska (MKV) container file format may be used to store streams of the media content without departing from this invention.

The performance of an adaptive bitrate streaming system in accordance with some embodiments of the invention can be significantly enhanced by encoding each portion of the source video in each of the alternative streams in such a way that the portion of video is encoded in each stream as a single (or at least one) closed group of pictures (GOP) starting with an Instantaneous Decoder Refresh (IDR) frame, which is an intra-frame. The playback device can switch between the alternative streams used during normal playback at the completion of the playback of a Cluster and, irrespective of the stream from which a Cluster is obtained, the first frame in the Cluster will be an IDR frame that can be decoded without reference to any encoded media other than the encoded media contained within the Cluster element In a number of embodiments, the playback device obtains information concerning each of the available streams from a top level index file or manifest file and selects one or more streams to utilize in the playback of the media. The playback device can then obtain header information from the container files containing the one or more bit streams or streams, and file headers and/or the manifest file can provide information concerning the decoding of the streams. The playback device can also request index information that indexes the encoded media stored within the relevant container files. The index information including, but not limited to, the metadata associating segments of the audio content with frames of the video content can be stored within the container files, separately from the container files in the top level index or in separate index files. The index information can enable the playback device to request byte ranges corresponding to GOPs within the container file via HTTP from the server. The playback device may obtain the metadata information in the index information when the top level index file is received, request the files storing the index information after the top level index file is received or request the portions of the container file storing the index information in accordance with various embodiments of the invention. The playback device uses the index information to request portions of the media content from the alternative streams in accordance with some embodiments. Playback is continued with the playback device requesting portions of the encoded content from a stream having media content that is encoded at a bitrate that can be supported by the network conditions.

The encoding of source video for use in adaptive bitrate streaming systems that provide audio playback during trick-play modes and the playback of the media content in a trick-play mode using adaptive bitrate streaming in accordance with some embodiments of the invention is discussed further below.

Adaptive Streaming System Architecture

Turning now to the FIG. 1, an adaptive streaming system including playback devices that provide audio playback during playback in a trick-play mode in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams and/or metadata information, at least a plurality of which are alternative streams. Alternative streams are streams that encode the same media content in different ways. In many instances, alternative streams encode media content (such as, but not limited to, video content and/or audio content) at different maximum bitrates. In a number of embodiments, the alternative streams of video content are encoded with different resolutions and/or at different frame rates. The top level index file and the container files are uploaded to an HTTP server 14. A variety of playback devices can then use HTTP or another appropriate stateless protocol to request portions of the top level index file, other index files, and/or the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Device

Figure 2:
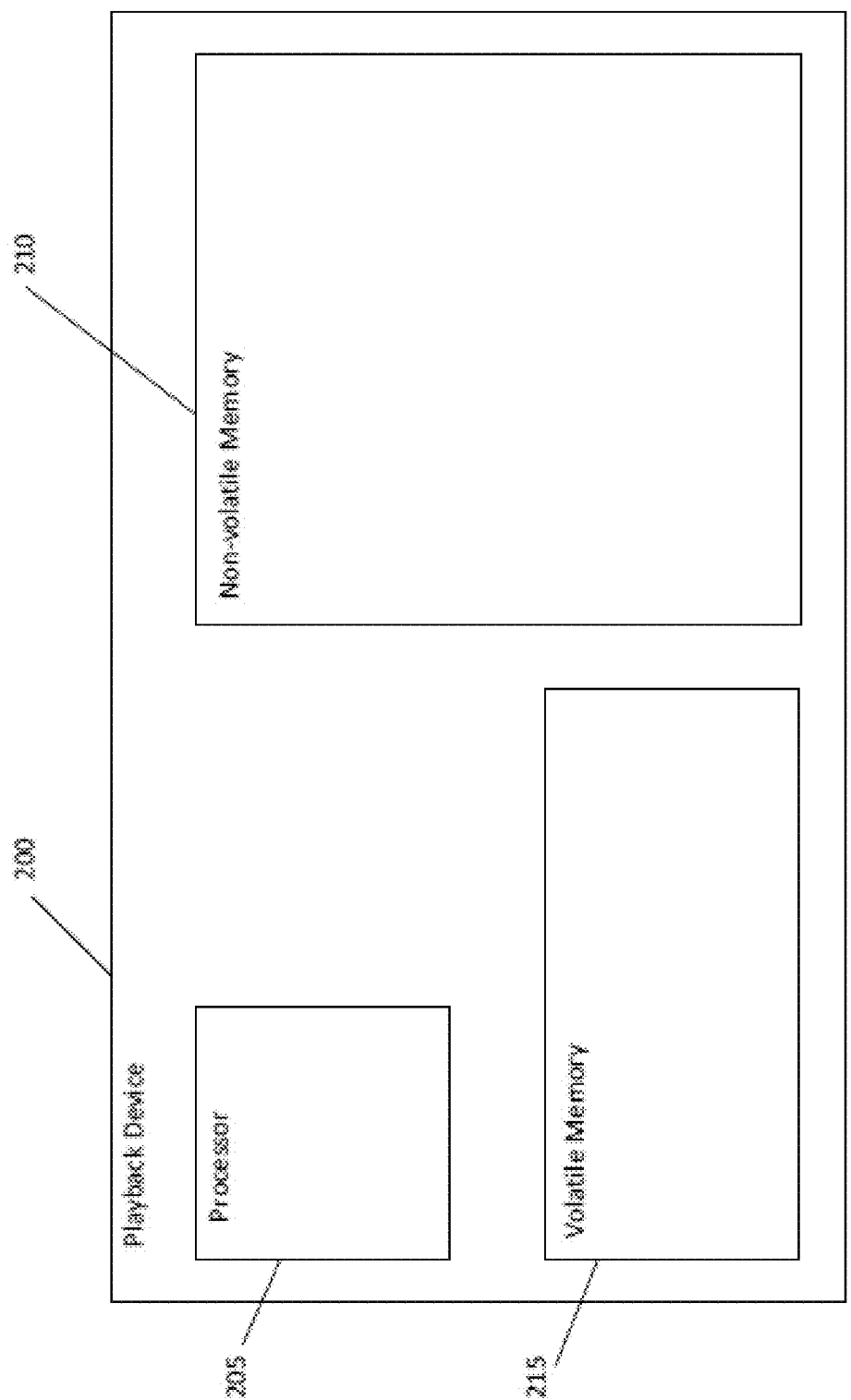
FIG. 2 illustrates a block diagram of components of a processing system such as a processing system in a playback device.

Some processes for providing methods and configuring systems in accordance with embodiments of this invention are executed by a playback device. The relevant components in a playback device that can perform the processes in accordance with an embodiment of the invention are shown in FIG. 2. One skilled in the art will recognize that playback device may include other components that are omitted for brevity without departing from described embodiments of this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In accordance with some embodiments, these instructions are included in a playback application that performs the playback of media content on a playback device. In accordance with various embodiments, the playback device software and/or firmware can be stored in any of a variety of non-transitory computer readable media appropriate to a specific application.

Servers

Figure 3:
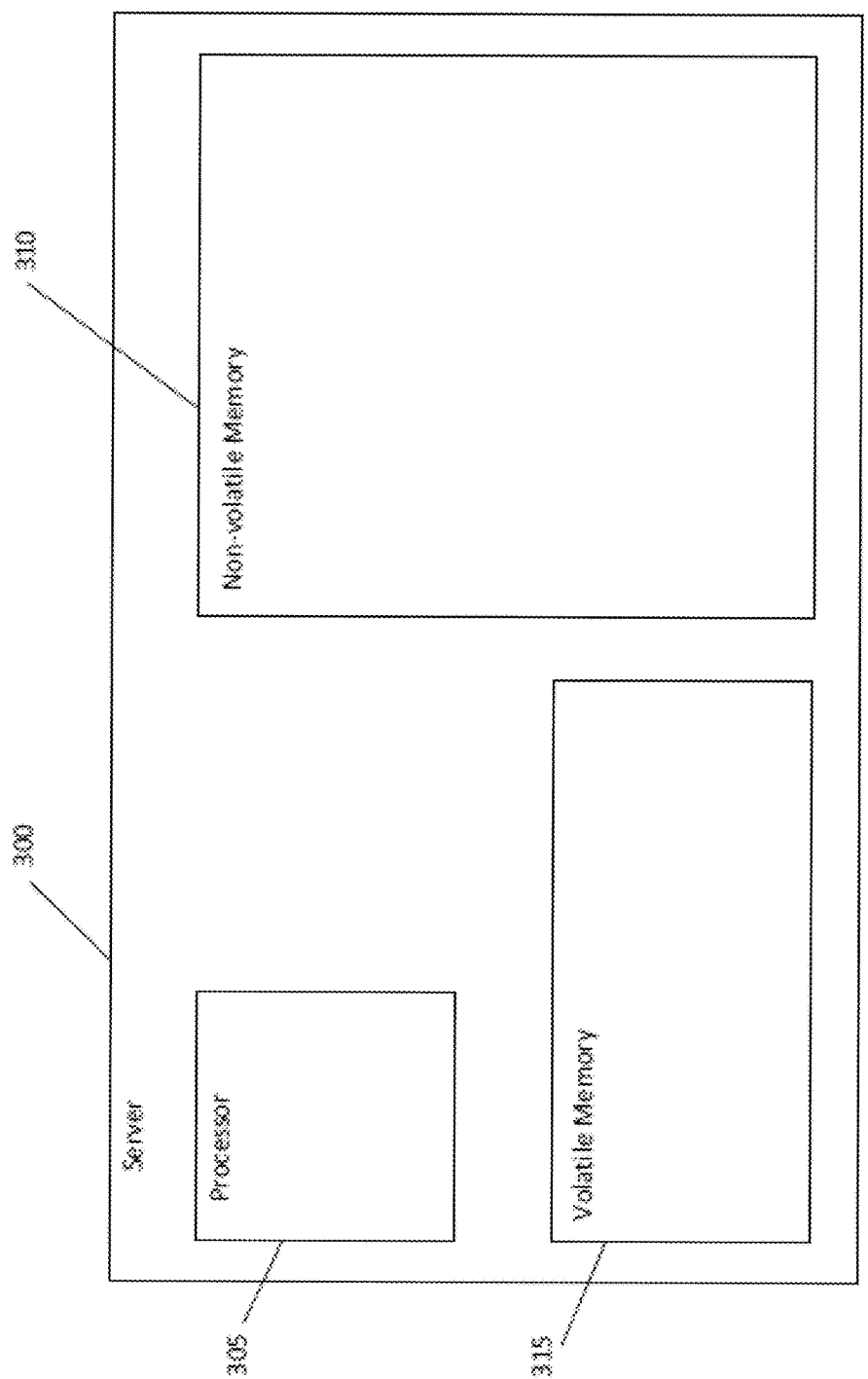
FIG. 3 illustrates a processing system such as a processing system that in an encoding system, and/or content provider system in accordance with an embodiment of the invention.

Some processes for providing methods and systems in accordance with embodiments of this invention are executed by the HTTP server; source encoding server; and/or local and network time servers. The relevant components in a server that performs one or more of these processes in accordance with embodiments of the invention are shown in FIG. 3. One skilled in the art will recognize that a server may include other components that are omitted for brevity without departing from the described embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes in accordance with embodiments of the invention and/or data for the processes being utilized. In accordance with some embodiments, instructions to perform encoding of media content are part of an encoding application. In accordance with various embodiments, the server software and/or firmware can be stored in any of a variety of non-transitory computer readable media appropriate to a specific application. Although a specific server is illustrated in FIG. 3, any of a variety of server configured to perform any number of processes can be utilized in accordance with embodiments of the invention.

Encoding of Streams of Audible and Video Content and Synchronization Information in Alternative Streams In accordance with some embodiments, a playback device that provides audible content during playback in a trick-play mode receives the media content including video content and audio content; and the synchronization information associating segments of the audio content to frames in the video content from a content provider system using adaptive bitrate streaming. To provide the required data to provide media content via adaptive bitrate streaming, the audio content and the video content can be encoded in streams and synchronization information for the audio content and the video content can be generated and stored in a manner such that the information may be provided to the playback device. In accordance with some embodiments, the audio content is encoded in one stream at a specific maximum bitrate; and the video content is encoded into multiple streams that are encoded at varying maximum bitrates, resolutions, aspect ratios, and the like for use by different playback devices experiencing differing network traffic conditions. In accordance with some other embodiments, the audio content is encoded in multiple streams at varying maximum bitrate; and the video content is encoded into multiple streams that are encoded at varying maximum bitrates, resolutions, aspect ratios, and the like for use by different playback devices experiencing differing network traffic conditions. In a number of embodiments, the video content may also be encoded into trick-play streams that only include specific portions of the video content for use in providing trick-play modes during playback.

Figure 4:
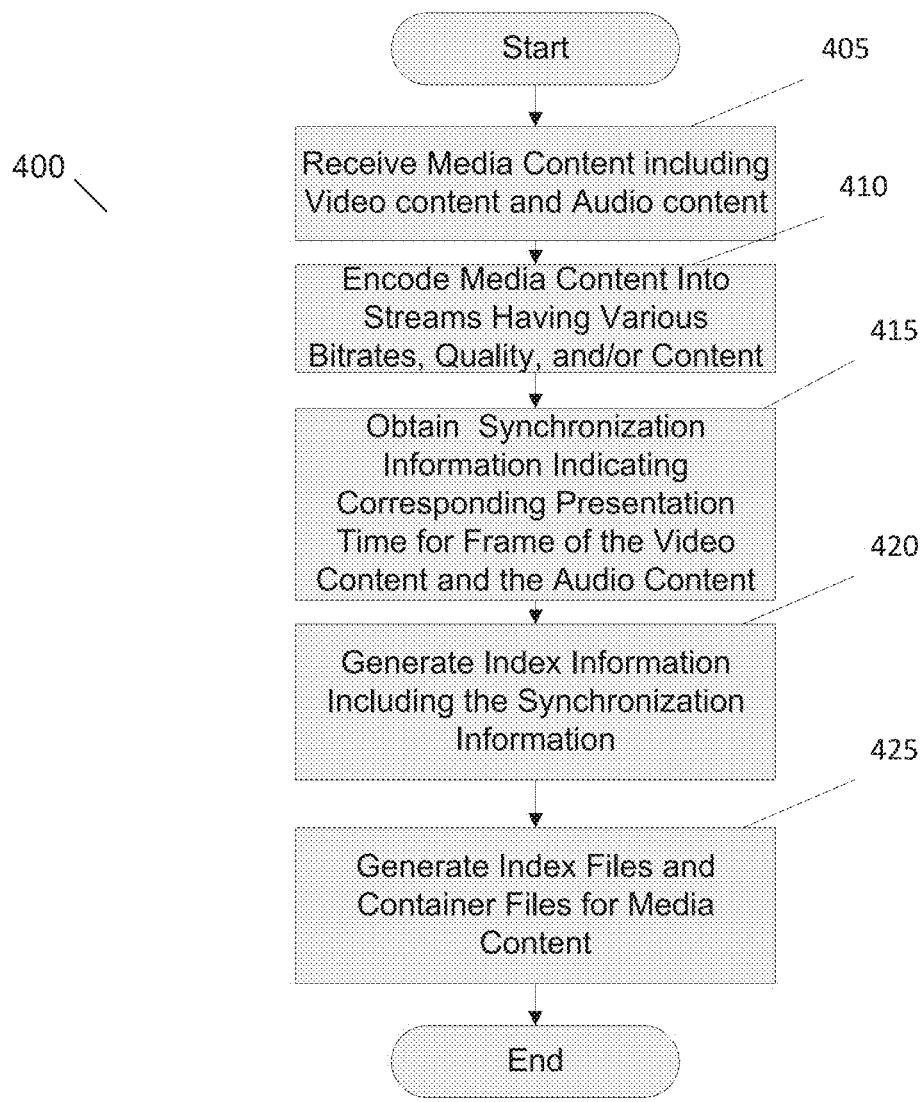
FIG. 4 illustrates a flow diagram of a process performed by an encoding system to encode streams of media content including at least one stream of audio data divided into segments and at least one stream of video content including frames and to generate synchronization data that associates one or more segments of the audio content with a frame of the video content in accordance with an embodiment of the invention.

In accordance with some embodiments, the synchronization information is included in index information stored in a top level index file. In accordance with many embodiments, the synchronization information is stored in an index file pointed to by the top level index file. In a number of embodiments, the synchronization information may be stored as metadata in files storing portions of the streams of audio content and/or video content. In accordance with some embodiments, the synchronization information may be determined from a subtitle track or closed caption track which associates video presentation times to verbal commentary and/or dialog. A process performed by an encoder server system for encoding media content including audio content and video content as well as synchronization information in accordance with an embodiment of this invention is shown in FIG. 4.

Process 400 begins by receiving media content to be encoded (405). The media content includes audio content and video content. In accordance with some embodiments of this invention, the audio content is divided into segments and the video content includes frames where each frame provides information for one or more of the images in the video content. The process 400 then encodes the audio content and video content into streams (410). In accordance with many embodiments, the audio content is encoded in one stream at a specific maximum bitrate; and the video content is encoded into multiple streams that are encoded at varying maximum bitrates, resolutions, aspect ratios, and the like for use by different playback devices experiencing differing network traffic conditions. In accordance with some other embodiments, the audio content is encoded in multiple streams at varying maximum bitrate; and the video content is encoded into multiple streams that are encoded at varying maximum bitrates, resolutions, aspect ratios, and the like for use by different playback devices experiencing differing network traffic conditions. In a number of embodiments, the video content may also be encoded into trick-play streams that only include specific portions of the video content for use in providing trick-play modes during playback.

Process 400 obtains synchronization information that associates the presentation time of at least some of the portions of the audible content with the presentation time of specific frames of the video content (415). In accordance with some embodiments, the synchronization information may be received along with the media content. In accordance with many embodiments, the synchronization information may be generated by encoder server system. In accordance with a number of embodiments, the synchronization information may be received as an input of an operator of the encoder synchronization server. The synchronization information can then be encoded as index information for the media content (420).

The process 400 generates the container files and index files for the media content (425). In accordance with some embodiments, each stream (of both audio and video content) is divided into segments and each segment is placed in a separate container file. In accordance with many embodiments, the audio data is segmented such that each identified portion of the audio content is a single segment and stored in a separate container file. In accordance with many embodiments, the index information is placed in the top level index file. In accordance with a number of embodiments, the index information is placed in one or more index files that are pointed to by the top level index file. In still some other embodiments, index information including the synchronization information is stored in container files as metadata. In some particular embodiments, the synchronization information for a particular portion of the audio data is stored as metadata in the container file storing the segment including the particular portion of audio data.

Although one embodiment for encoding alternative streams of media content including audio content, video content, and synchronization information in accordance with one embodiment of the invention are described above. One skilled in the art will recognize that other processes for encoding the streams may be performed in accordance with some embodiments of the invention.

Playback of Media Content Including Providing Audio Data in A Trick-Play Mode

Figure 5:
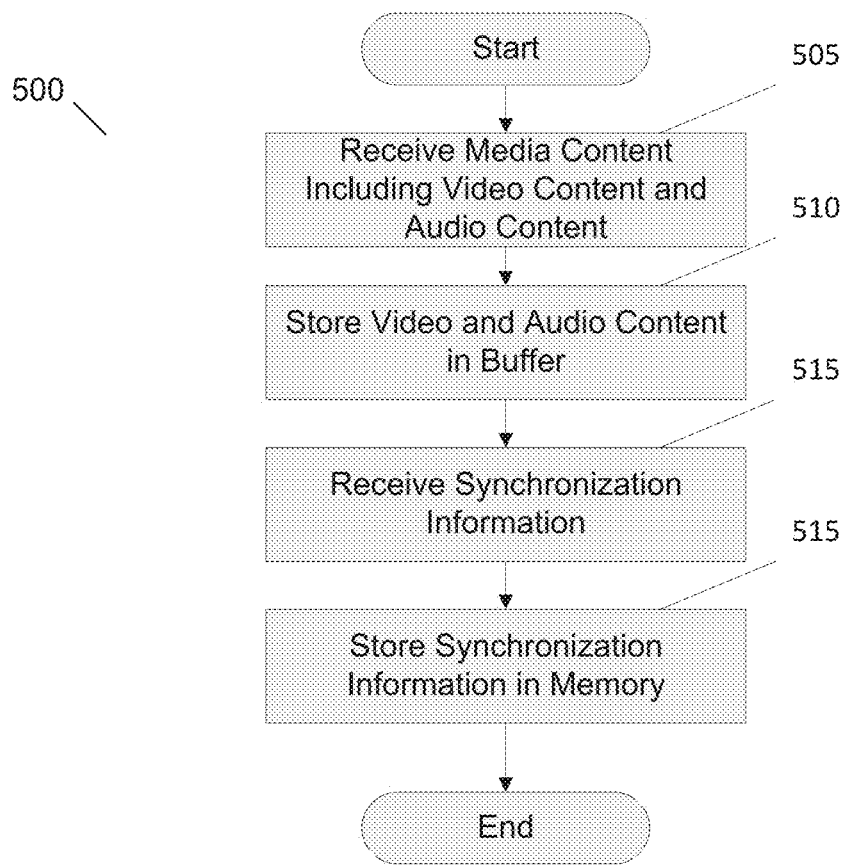
FIG. 5 illustrates a flow diagram of a process performed by a playback device to obtain audio and video content of the media content as well as synchronization information for the media content in accordance with an embodiment of the invention.

In accordance with some embodiments of the invention, a playback device provides audio content during playback in a trick play mode. To do so, the playback device stores audio content that is divided into portions, video content that includes images that are each associated with a frame, and synchronization data that associates a presentation time of a portion of the audio content with a presentation time of a frame for images in the audio content. A process for obtaining the audio content, video content and synchronization information in accordance with an embodiment of this invention is shown in FIG. 5.

The Process 500 receives the media content including audio content and video content (505). In accordance with some embodiments of the invention, the media content is received via adaptive bit rate streaming. In accordance with some other embodiments, the media content may be read from a memory. In accordance with still other embodiments, the media content is read from a non-transitory media storing the media content. The video content includes images. Each of the images is associated with a frame that provides information for forming the image. The audio content is divided into segments that have a playback duration that is approximately equal to or less than the playback duration of images associated with a frame in the video content. The audio content and the video content are stored in a buffer for playback as the media content is decoded by the playback device (510).

Synchronization information is received (515) in process 500. The synchronization information associated the presentation time(s) of one or more portions of the audio content to the presentation of a frame for images in the video content. In accordance with some embodiments, the synchronization information includes synchronization information for each portion of the audio content. In accordance with some other embodiments, the synchronization information includes synchronization information associated at least one portion of audio data with each frame of the video data. In accordance with still other embodiments, the synchronization information may only associate particular portions of the audio data with particular frames in the video data. The received synchronization information is stored in a memory for use during playback and more particularly for use during playback of audio content in a trick-play mode in accordance with some embodiments of this invention (520).

Although various processes for obtaining media content for use in providing playback of audio content in a trick-play mode are discussed above with reference to FIG. 5, one skilled in the art will recognize that other processes for obtaining media content may be performed in accordance with various embodiments of this invention.

Figure 6:
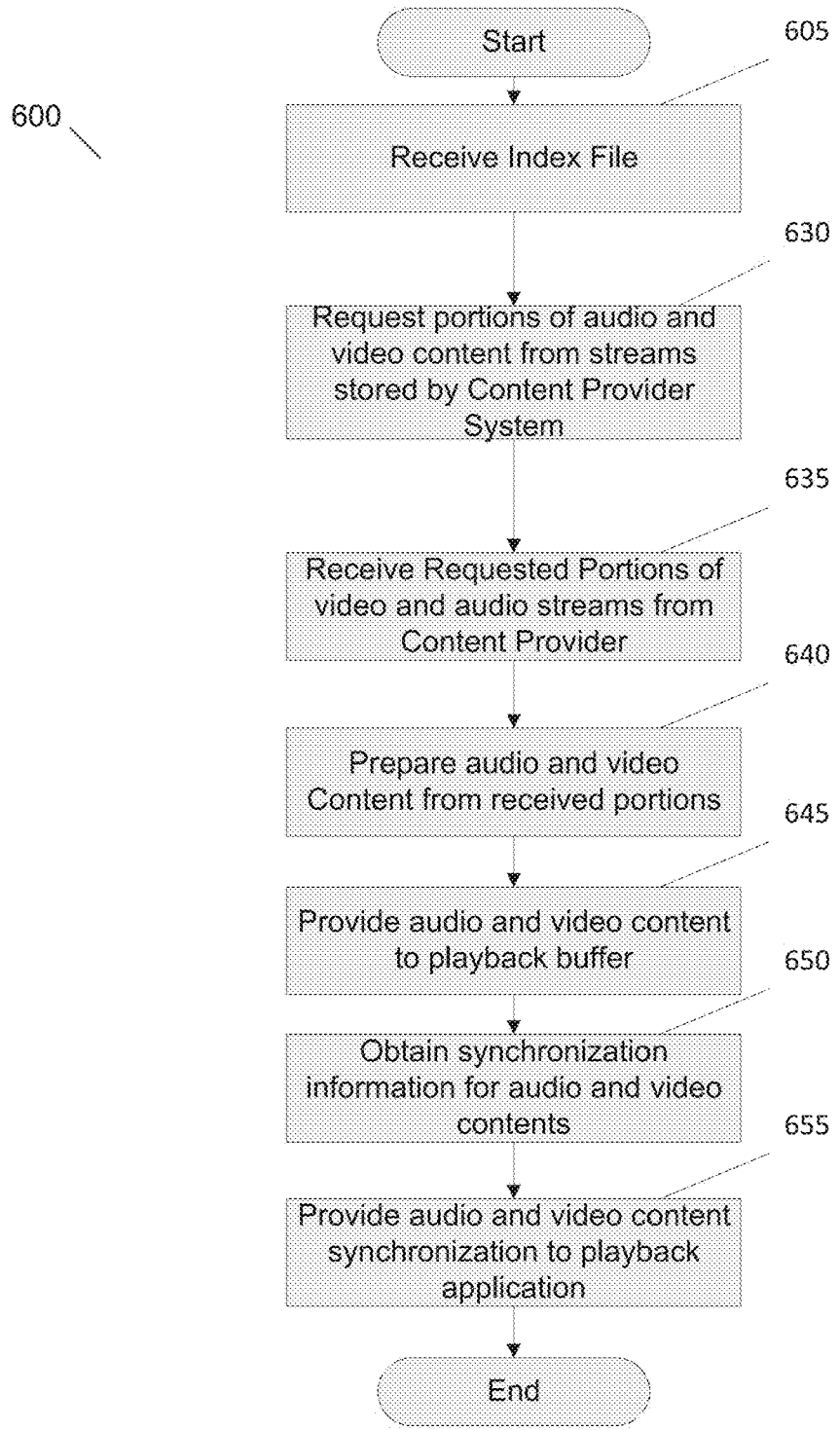
FIG. 6 illustrates a flow diagram for a process performed by a playback device to obtain audio and video content for the media content as well as synchronization information for the media content using adaptive bitrate streaming in accordance with an embodiment of the invention.

In accordance with some particular embodiments of the invention, a playback device may obtain media content for use in providing playback of audio content in a trick-play mode using adaptive bit rate streaming. A process for obtaining audio content, video content, and synchronization information for use in providing playback of audio content in a trick-play mode in accordance with an embodiment of the invention is shown in FIG. 6.

In process 600, the playback device receives an index file from a content provider system (605). The playback device uses the index file to request portions of the audio content and video content from content provider system (630). In accordance with some embodiments of the invention, the playback device monitors the network bandwidth for communications over the network between the playback device and the content provider system; and selects streams of the audio and video content that are encoded at highest maximum bitrates that can be handled in accordance with the measured bandwidth. Systems and methods for selecting a stream and commencing playback and obtaining media content using adaptive bit rate streaming are further disclosed in more detail by U.S. patent application Ser. No. 13/251,061 entitled "Systems and Methods for Determining Available Bandwidth and Performing Initial Stream Selection When Commencing Streaming Using Hypertext Transfer Protocol" and U.S. patent application Ser. No. 13/339,992 entitled "Systems and Methods for Performing Multiphase Adaptive Bitrate Streaming," the disclosures of which are hereby incorporated by reference in their entirety. The requested portions of audio and video content are received by the playback device (635). The audio and video contents are then prepared from the received portions (640) by the playback and provided to a buffer in the playback device to store for presentation (645) by a client application. One skilled in the art will note that the requesting (630), receiving (635), generating (640) and providing of the audio and video content may be performed iteratively until all of the audio and video contents of the media content is received by the playback device in accordance with adaptive bitrate streaming processes.

The playback device also obtains the synchronization information that associates the presentation of segments of the audio content to the presentation of frames of the video content (650). In accordance with some embodiments, the synchronization information may be read from the top level index file when the top level index file is received system during an initial start-up of an adaptive bitrate streaming process. In accordance with some other embodiments, the playback device reads a pointer to an index file from the top level index file; and requests and receives the index file from content provider system during an initial start-up of an adaptive bitrate streaming process. In accordance with still other embodiments, the synchronization information is received as metadata during the streaming of the audio and/or video contents. In accordance with some embodiments, the synchronization information may be determined from a subtitle track or closed caption track which associates video presentation times to verbal commentary and/or dialog. The synchronization information is then provided to the client playback application (655) which may store the synchronization as a data structure in memory for use during playback.

Although a process for obtaining media content for use in providing playback of audio content in a trick-play mode using adaptive bitrate streaming is discussed above with reference to FIG. 6, one skilled in the art will recognize that other processes for obtaining media content may be performed in accordance with various embodiments of this invention.

Provision of Audible Playback During a Trick-Play Mode

Figure 7:
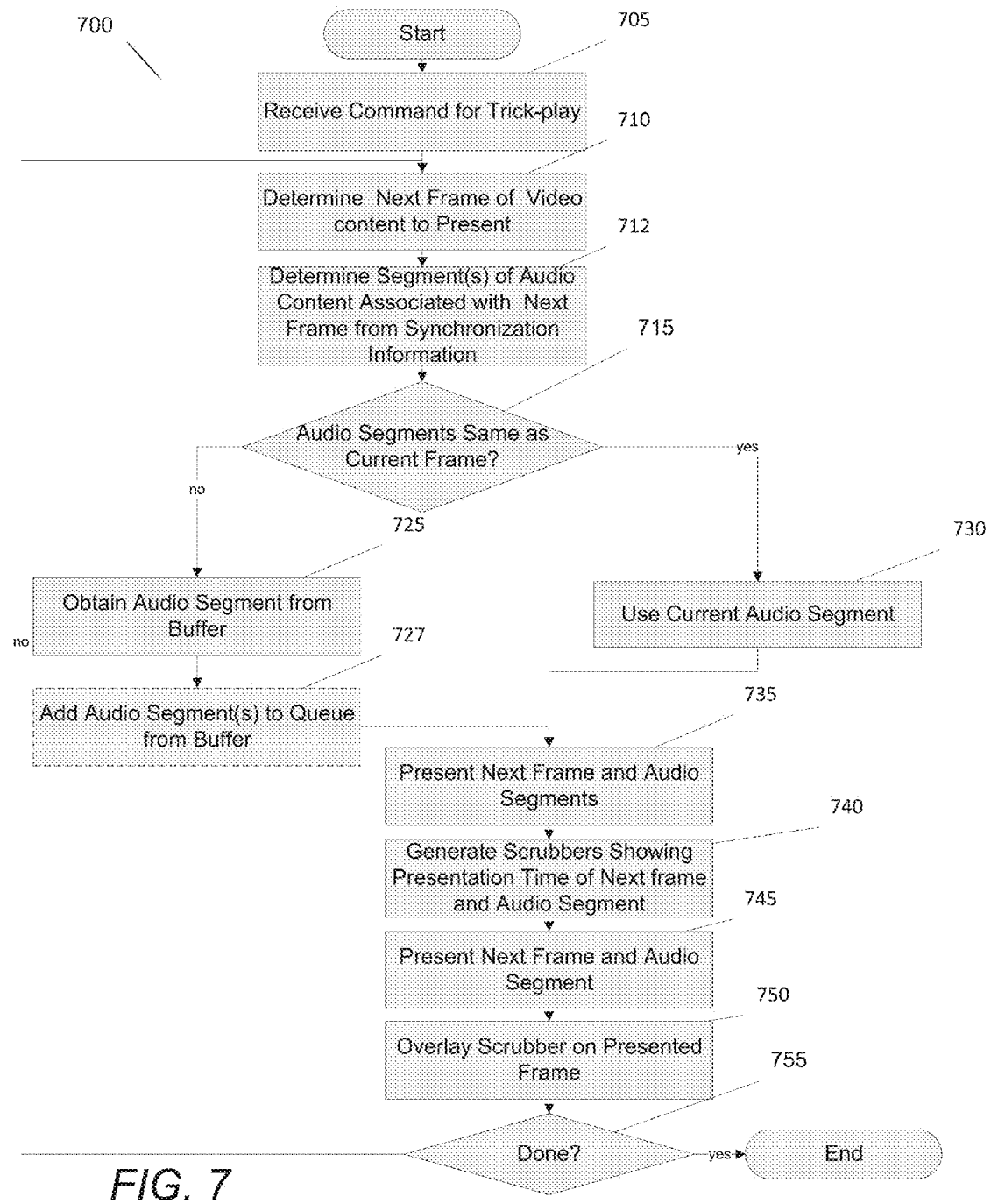
FIG. 7 illustrates a flow diagram for a process performed by a playback device to provide audio content during playback of media content in a trick-play mode in accordance with an embodiment of the invention.

Sometimes the audible content in a media presentation can indicate a portion of media content that may be of interest to a user. For example, the media content of a sporting event may include audible content of a play-by description of the plays. A user can find portion of content that is of interest, such as a score or important play from this description while using a trick-play to find event of interest in the content. As such, some playback systems may want to provide audible content during playback during a trick-play mode to enhance the user experience. A process performed by a playback device to provide audible playback during a trick-play mode in accordance with an embodiment of this invention is shown in FIG. 7.

In process 700, the playback device receives a request to present the media content in a trick-play mode (705). In accordance with some embodiments, trick-play modes can include, but are not limited to, fast forward, rewind, forward seek and backward seek. In accordance with many embodiments, the trick-play mode command is received as input via an Input/Output (I/O) device. Examples of I/O devices in accordance with various embodiments of this invention include, but are not limited to, a keyboard, a mouse, a touch screen, and the like. The playback device determines the next frame of video content to present based upon the current trick-play mode initiated by the command (710). In accordance with some embodiments of the invention, the next frame to present is based upon the trick-play mode being employed and the selected speed of the trick-play mode. In accordance with some other embodiments, the next frame may be determined based upon a predetermined list of images to present such as, but not limited to, predetermined images presented in a seek a mode.

The playback device determines the segment(s) of audio content associated with the next frame using the synchronization information stored by the playback device (712). The segment(s) of audio content associated with the next frame to present is compared to the segments of audio content associated with the current frame of video content being presented (715). If the segment(s) of audio content associated with the next frame is the same as the segment(s) of audio content associated with the current frame being presented, the current audio segment(s) being presented is used for playback (730). In accordance with some embodiments, the use of the current audio content may include presenting the current segments of audio content a second time. In other embodiments, the use of the current audio segment may include allowing the entire segment and/or segments subsequent to the current segment of audio data to be presented. The next frame is then obtained from the buffer for presentation (735). If the segment(s) of audio content associated with the next frame is different from the segment(s) of audio content associated with the current frame being presented, the playback device then obtains the segment(s) of audio content associated with the next frame from the buffer(s) storing the audio content (725). One skilled in the art will appreciate that duration of the presentation of the audio segment(s) may be different than the presentation time of the frame. Thus, a queue of audio segments to play may be maintained and the obtained audio segments are added to the queue (727).

The next frame is presented using the display device and the audio segments are presented using the audio system (735) In accordance with many embodiments, the audio segments are presented in the order provided by the queue. In accordance with some of these embodiments, the queue may provide indications of when an audio segment is associated with multiple segments requiring either re-presenting the audio segment during playback or providing subsequent segments until the frame associated audio segment changes.

Figure 8:
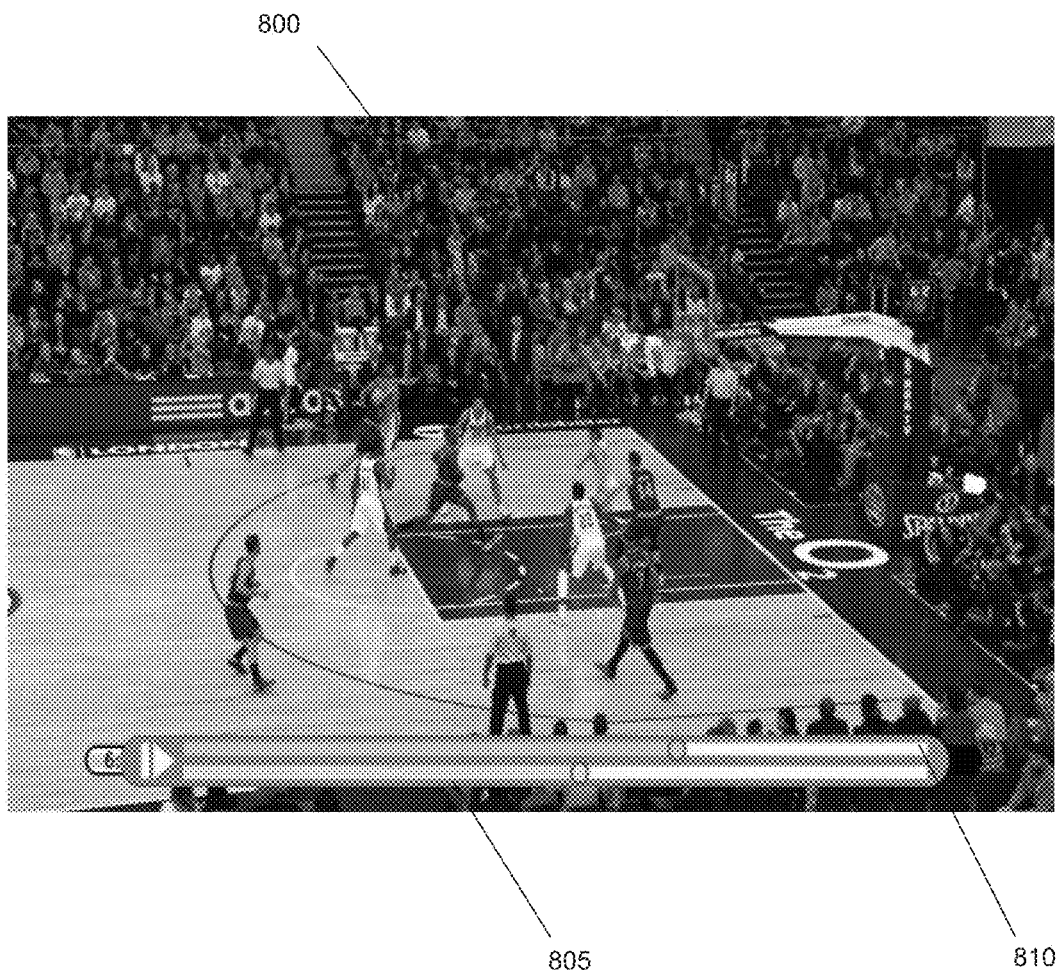
FIG. 8 illustrates a screen shot of a display during playback providing audio content during a trick-play mode in accordance with an embodiment of the invention.

In accordance with some embodiments, a display of "scrubbers" indicating the presentation time of the currently presented audio segment with reference to an overall presentation time and the presentation time of the current image being presented with reference to the overall presentation time are generated to indicate the current audio segment and image being presented (740). An example of a display during playback with audio content having scrubbers indicating the presentation times of the video and audio contents in accordance with an embodiment of the invention is shown in FIG. 8. Display 800 is currently showing a frame of video content having a presentation time indicated by the dot on a video scrubber 805. The presentation time of the audio content being presented via the audio system is shown on audio scrubber 810. As can be seen in FIG. 8, there may not be a one to one correspondence between the presentation time of the images in the trick-play mode and the presentation of the audio segments, the video scrubber 805 and audio scrubber 810 are useful to see the difference in the presentation time between the audio and video contents being presented to allow a user to find the presentation time of desired content.

Returning to FIG. 7, the current image and the audio segment associated with the image are presented (745). In accordance with some embodiments, the audio content associated with a frame of an image is played while the image is being presented and the audio segment being presented changes when the frame associated with the image being presented changes. In accordance with some other embodiments, a queue of the audio content to present is maintained and the audio content is played back according to the queue, independent of the images being presented in the trick-play mode. In accordance with embodiments providing the "scrubbers", the display of generated "scrubbers" are overlaid onto the image being presented (750).

The playback device then determines whether the trick-play mode is completed (755). In accordance with some embodiments, the indication of the completion of a trick-play mode may be the receiving of an input command indicating the resumption of normal playback. In accordance with other embodiments, the indication of the completion of trick play may be reaching a predetermined portion of the media content. If the trick-play mode is completed, process 700 ends and conventional playback is resumed. If the playback mode is not completed, the process 700 repeats from the determination of the next frame to present and using the previously determined next frame as the current frame.

Although various processes for providing audio playback during a trick-play mode in accordance with an embodiment of the invention are described above with reference to FIG.

7, other processes may be performed by a playback device to provide audio playback during a trick-play mode in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method for providing playback of audio content in a trick-play mode during playback of media content, the method comprising:
storing a plurality of frames of a video content portion of media content in a buffer in a playback device, wherein each video frame of the plurality video frames has a presentation time;
storing a plurality of segments of an audio content portion of media content in a buffer in the playback device,
wherein each audio segment is divided from a first audio stream and stored as an individual segment,
wherein each audio segment is associated with a set of one or more video frames, and
wherein each audio segment has a presentation time such that each audio segment presentation time is the same presentation time of the associated set of video frames;
receiving a command for trick-play mode of the audio content in the playback device, wherein the trick-play mode is selected from the group consisting of fast-forward, slow-forward, and rewind;
determining a first set of one or more audio segments from the plurality of audio segments of the first audio stream to be presented based upon the command for trick play of the media content using the playback device and using the presentation time of at least one segment of the first set of segments;
determining a second set of one or more audio segments from the plurality of audio segments of the first audio stream to be presented based upon the trick play of the media content using the playback device and using the presentation time of at least one segment of the second set of segments, wherein the second set of audio segments would not immediately succeed the first set of audio segments if the first and second sets of audio segments were played back in a normal play mode; and
presenting the first set of audio segments and then immediately presenting the second set of audio segments in the trick-play mode using the playback device.

2. The method of claim 1 further comprising:
presenting a set of video frames in the trick-play mode on a display of the playback device.

3. The method of claim 2 wherein the second set of audio segments is presented concurrently with the presentation of the set of video frames.

4. The method of claim 2 further comprising:
adding each set of audio segments to a queue based on the command for the trick-play mode; and
wherein each set of audio segments is presented based upon the queue in an order as determined by the trick-play mode and is independent of the presentation of the set of video frames on the display of the playback device.

5. The method of claim 2 further comprising:
generating a display of a scrubber for the video content indicating a presentation time of the set of video frames using the playback device; and
overlaying the display of the scrubber for the video content over the presentation of the image on the display.

6. The method of claim 2 further comprising:
generating a display of a scrubber for the audio content indicating a presentation time of each the first and the second set of audio segments using the playback device; and
overlaying the display of the scrubber for the audio content over the presentation of the image on the display.

7. The method of claim 6 wherein the scrubber for the audio content is separate from a scrubber for the video content in the display.

8. The method of claim 1 further comprising:
receiving data for the plurality of segments of the audio content portion and data for the plurality of frames of the video content in the playback device from a content provider system over a network using adaptive bitrate streaming.

9. The method of claim 8 wherein the receiving of the data for the plurality of segments of the audio content portion and the data for the plurality of frames of the video content in the playback device from a content provider system over a network using adaptive bitrate streaming comprises:
receiving a top level index file from the content provider system in the playback device over a network wherein the top level index files identifies a plurality of alternative streams of video content wherein at least a portion of the plurality of alternative streams are encoded at different maximum bitrates, and at least one stream of audio content; and
requesting portions of the video content from the plurality of alternative streams from the content provider system using the playback device based upon network bandwidth between the playback device and the content provider system;
receiving the requested portions of the video content in the playback device in response to the requests;
generating the plurality of frames of the video content in the playback device from the portions of video content received by the playback device;
storing the plurality of frames in a buffer of the playback device;
requesting portions of the audio content from the at least one streams of audio content from the content provider system using the playback device;
receiving the requested portions of the audio content in the playback device;
generating the plurality of segments of the audio content from the portions of audio content received using the playback device;
storing the plurality of segments of audio content in a buffer of the playback device;
determining the presentation time of each audio segment from the association between each audio segment with a set of one or more video frames using the playback device based upon information in the top level index file; and storing the presentation time of each audio segment in the memory of the playback device.

10. The method of claim 9, wherein the determining the presentation time of each audio segment comprises:
reading a pointer to a file including the association between each audio segment with a set of one or more video frames from the top level index file using the playback device;
requesting the file from content provider system using the playback device; and
receiving the requested file in the playback device.

11. A playback device comprising:
a memory;
a network interface; and
a processor that reads instructions stored in the memory that direct the processor to:
store a plurality of frames of a video content portion of media content in a buffer in the playback device,
store a plurality of segments of an audio content portion of media content in a buffer in the playback device, wherein each audio segment is divided from a first audio stream and stored as an individual segment, wherein each audio segment is associated with a set of one or more video frames, and
wherein each audio segment has a presentation time such that that each audio segment presentation time is the same presentation time of the associated set of video frames,
receive a command for trick-play mode of the audio content, wherein the trick-play mode is selected from the group consisting of fast-forward, slow-forward, and rewind,
determine a first set of one or more audio segments from the plurality of audio segments of the first audio stream to be presented based upon the command for trick play of the media content using the playback device and using the presentation time of at least one segment of the first set of segments,
determine a second set of one or more audio segments from the plurality of audio segments of the first audio stream to be presented based upon the trick play of the media content using the playback device and using the presentation time of at least one segment of the second set of segments, wherein the second set of audio segments would not immediately succeed the first set of audio segments if the first and second sets of audio segments were played back in a normal play mode, and
present the first set of audio segments and then immediately present the second set of audio segments in the trick-play mode.

12. The playback device of claim 11 wherein the instructions further direct the processor to:
present the a set of video frames in the trick-play mode on a display of the playback device.

13. The playback device of claim 12 wherein the second set of audio segments is presented concurrently with the presentation of the set of video frames.

14. The playback device of claim 12 wherein the instructions further direct the processor to:
add each set of audio segments to a queue on the command for the trick-play mode; and
wherein each set of audio segments is presented based upon the queue in an order as determined by the trick-play mode and is independent of the presentation of the set of video frames on the display of the playback device.

15. The playback device of claim 12 wherein the instructions further direct the processor to:
generate a display of a scrubber for the video content indicating a presentation time of the set of video frames; and
overlay the display of the scrubber for the video content over the presentation of the next frame on the display.

16. The playback device of claim 12 wherein the instructions further direct the processor to:
generate a display of a scrubber for the audio content indicating a presentation time of each the first and the second set of audio segments; and
overlay the display of the scrubber for the audio content over the presentation of the image on the display.

17. The playback device of claim 16 wherein the scrubber for the audio content is separate from a scrubber for the video content in the display.

18. The playback device of claim 11 wherein the instructions further direct the processor to:
receive data for the plurality of segments of the audio content portion and data for the plurality of frames of the video content in the playback device from a content provider system over a network using adaptive bitrate streaming.

19. The playback of claim 18 wherein instructions to receive of the data for the plurality of segments of the audio content portion and the data for the plurality of frames of the video content from a content provider system over a network using adaptive bitrate streaming further direct the processing system to:
receive a top level index file from the content provider system from a content provider system over a network wherein the top level index files identifies a plurality of alternative streams of video content wherein at least a portion of the plurality of alternative streams are encoded at different maximum bitrates, and at least one stream of audio content; and
request portions of the video content from the plurality of alternative stream from the content provider system based upon network bandwidth between the playback device and the content provider system;
receive the requested portions of the video content;
generate the plurality of frames of the video content from the portions of video content received;
store the plurality of images in a buffer;
request portions of the audio content from the at least one streams of audio content from the content provider system;
receive the requested portions of the audio content;
generate the plurality of segments of the audio content from the portions of audio content received;
store the plurality of segments of audio content in a buffer of the playback device;
determine the presentation time of each audio segment from the association between each audio segment with a set of one or more video frames based upon information in the top level index file; and
store the presentation time of each audio segment in the memory of the playback device.

20. A non-transitory machine readable medium containing processor instructions, where execution of the instructions by a processor causes the processor to perform a process comprising:
storing a plurality of frames of a video content portion of media content in a buffer in a playback device, wherein each video frame of the plurality video frames has a presentation time;

storing a plurality of segments of an audio content portion of media content in a buffer in the playback device,
  wherein each audio segment is divided from a first audio stream and stored as an individual segment,
  wherein each audio segment is associated with a set of one or more video frames, and
  wherein each audio segment has a presentation time such that each audio segment presentation time is the same presentation time of the associated set of video frames;
receiving a command for trick-play mode of the audio content, wherein the trick-play mode is selected from the group consisting of fast-forward, slow-forward, and rewind;
determining a first set of one or more audio segments from the plurality of audio segments of the first audio stream to be presented based upon the command for trick play of the media content using the playback device and using the presentation time of at least one segment of the first set of segments;
determining a second set of one or more audio segments from the plurality of audio segments of the first audio stream to be presented based upon the trick play of the media content using the playback device and using the presentation time of at least one segment of the second set of segments, wherein the second set of audio segments would not immediately succeed the first set of audio segments if the first and second sets of audio segments were played back in a normal play mode; and
presenting the first set of audio segments and then immediately presenting the second set of audio segments of the audio content in the trick-play mode.

21. The method of claim 1, wherein the presentation time of at least one audio segment of the plurality of audio segments is determined from a subtitle track or a closed caption track.

22. The method of claim 1, wherein each audio segment has a playback duration that is approximately equal to or less than the playback duration of images associated with a video frame.

23. The method of claim 1, wherein the first set of audio segments of and the second set of segments each consist of the same set of audio segments.

24. The method of claim 11, wherein the presentation time of at least one audio segment of the plurality of audio segments is determined from a subtitle track or a closed caption track.

25. The method of claim 11, wherein each audio segment has a playback duration that is approximately equal to or less than the playback duration of images associated with a video frame.

26. The method of claim 1, wherein the first set of audio segments of and the second set of segments each consist of the same set of audio segments.

* * * * *